United States Patent
Przyjemski et al.

(10) Patent No.: US 6,388,610 B1
(45) Date of Patent: *May 14, 2002

(54) ANTIJAM NULL STEERING CONFORMAL CYLINDRICAL ANTENNA SYSTEM

(75) Inventors: Joseph M. Przyjemski, Acton; Jeffrey B. Lozow, Middleton, both of MA (US)

(73) Assignee: The Charles Stark Draper Laboratory, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,917

(22) Filed: Jan. 23, 1998

(51) Int. Cl.[7] ................................................. G01S 5/14
(52) U.S. Cl. ................... 342/357.06; 342/383; 342/362
(58) Field of Search .......................... 342/17, 19, 368, 342/361, 362, 357.06, 16, 383; 244/3.19

(56) References Cited

U.S. PATENT DOCUMENTS

| | | | | |
|---|---|---|---|---|
| 4,635,063 A | * | 1/1987 | Chang et al. | 342/383 |
| 4,717,919 A | * | 1/1988 | Cherette | 342/383 |
| 4,816,836 A | * | 3/1989 | Lalezari | 343/700 MS |
| 4,853,702 A | * | 8/1989 | Shiokawa | 342/363 |
| 4,931,808 A | * | 6/1990 | Lalezari et al. | 343/753 |
| 5,220,330 A | * | 6/1993 | Salvail et al. | 342/62 |
| 5,347,287 A | * | 9/1994 | Speciale | 342/375 |
| 5,410,320 A | * | 4/1995 | Rudish | 342/373 |
| 5,471,220 A | * | 11/1995 | Hammers et al. | 342/372 |
| 5,647,558 A | * | 7/1997 | Linick | 244/3.11 |
| 5,712,641 A | * | 1/1998 | Casabona et al. | 342/362 |
| 5,955,987 A | * | 9/1999 | Murphy et al. | 342/357.06 |

OTHER PUBLICATIONS

Hargrave, P.J. "Adaptive Antennas For Modern Electronic Systems", 6th Internatinal Conf. on Antennas and Propagation (ICAP '89), Apr. 1989, pp. 277–283.*

Gecan, Anton et al, "Jammer Cancellation with Adaptive Arrays for GPS Signals", Proc. of the IEEE Southeastcon '96, Bringing Together Education, Science and Technology, 1996, pp. 320–323.*

* cited by examiner

Primary Examiner—Gregory C. Issing
(74) Attorney, Agent, or Firm—Iandiorio & Teska

(57) ABSTRACT

An antijam null steering conformal cylindrical antenna system includes a cylindrical array of linearly polarized individually weighted antenna elements; a plurality of weighting circuits one associated with each of the elements; and means, responsive to the power output of the weighting circuit, for decreasing the sensitivity in the direction of the maximum incident power.

9 Claims, 3 Drawing Sheets

ANTIJAM NULL STEERING CONFORMAL CYLINDRICAL ANTENNA SYSTEM

FIELD OF INVENTION

This invention relates to a null steering conformal cylindrical antenna system, and more particularly to such a system which prevents jamming of GPS signals.

BACKGROUND OF INVENTION

The Global Positioning System (GPS) has become an important component of civilian and military navigation and locating systems. GPS signals, however, typically in the range of 1.5 GHz, are quite weak and easily jammed. Jamming signals are typically relatively very high power; usually they are the highest power incident signals and they come from specific changing directions.

Conventional implementations of GPS antennas on cylindrical vehicles or projectiles, e.g., munitions, typically include an array of circularly polarized elements whose outputs are combined to produce an omnidirectional gain pattern that can provide no rejection of jamming power and therefore does not enhance GPS performance.

Another technique selects certain circularly polarized elements known to point only in the direction of the GPS satellite signal source(s) and, in so doing, provides suppression of the jammer. This concept, however, is limited to applications in which the orientation of the munitions about its axis relative to the GPS satellites is known a priori. Such a technique is ineffective in gunfire applications where the round is spinning and its orientation is generally unknown during the GPS signal acquisition. A third technique attempts to implement a null steering system using circularly polarized elements which are large and, therefore, must be fewer in number and/or more closely spaced about the surface of the munition. Insufficient array elements, or a close spacing contributes to undesirable mutual coupling, and is detrimental to the formation of good jammer rejecting nulls. Poorer performance in this latter method is further exacerbated by depolarization of signals received at oblique angles. All of these effects are most pronounced on the small surface areas which characterize 105 mm, 5" and 155 mm caliber projectiles. It is within this class of munitions that the need for jammer rejection is greatest and is most difficult to obtain.

SUMMARY OF INVENTION

It is therefore an object of this invention to provide an improved null steering antijamming antenna system.

It is a further object of this invention to provide such a null steering antijamming antenna system which is conformal and simple.

It is a further object of this invention to provide such a null steering antijamming antenna system which is effective with low cost microstrip antennas.

It is a further object of this invention to provide such a null steering antijamming antenna system which is effective with cylindrical bodies including projectiles and munitions.

It is a further object of this invention to provide such a null steering antijamming antenna system which is effective with rotating bodies.

It is a further object of this invention to provide such a null steering antijamning antenna system which has a more uniform coverage pattern and reduces mutual coupling interference.

It is a further object of this invention to provide such a null steering antijamming antenna system which decreases a jamming signal relative to the GPS signal.

The invention results from the realization that a truly effective antijam null steering antenna system capable of improving GPS signal to noise performance relative to jamming signals can be conformed to cylindrical bodies, even small ones like projectiles and munitions, by using a cylindrical array of linearly polarized individually weighted antenna elements and associated weighting circuits with a constrained power minimization circuit such as an Applebaum circuit or least mean squares circuit to always maintain reduced sensitivity in the direction of the maximum incident power or jamming signal. This realization results from the recognition that, while using the linearly polarized antenna the system reduces the GPS signal reception by a factor of two compared to circularly polarized antennas, the noise rejection obtainable can reduce the jamming signal by a factor of a thousand and thus greatly enhance overall GPS signal recovery.

This invention features an antijam null steering conformal cylindrical antenna system including a cylindrical array of linearly polarized individually weighted antenna elements. There are a plurality of weighting circuits one associated with each of the elements and means, responsive to the power output of the weighting circuits, for decreasing the sensitivity in the direction of the maximum incident power.

In a preferred embodiment the cylindrical array may be a right circular cylinder array. The elements may be approximately one half wavelength long, one quarter wavelength wide, and spaced on one half wavelength centers. There may be at least four such elements. The weighting circuit may include a gain circuit. The antenna system may be a GPS receiver antenna system having a frequency of approximately 1.5 GHz. The means for decreasing sensitivity may include various circuits for constrained minimization of power at the output of the subject antenna system, e.g., a least mean square circuit or an Applebaum circuit.

DISCLOSURE OF PREFERRED EMBODIMENT

Other objects, features and advantages will occur to those skilled in the art from the following description of a preferred embodiment and the accompanying drawings, in which.

Figure 3:
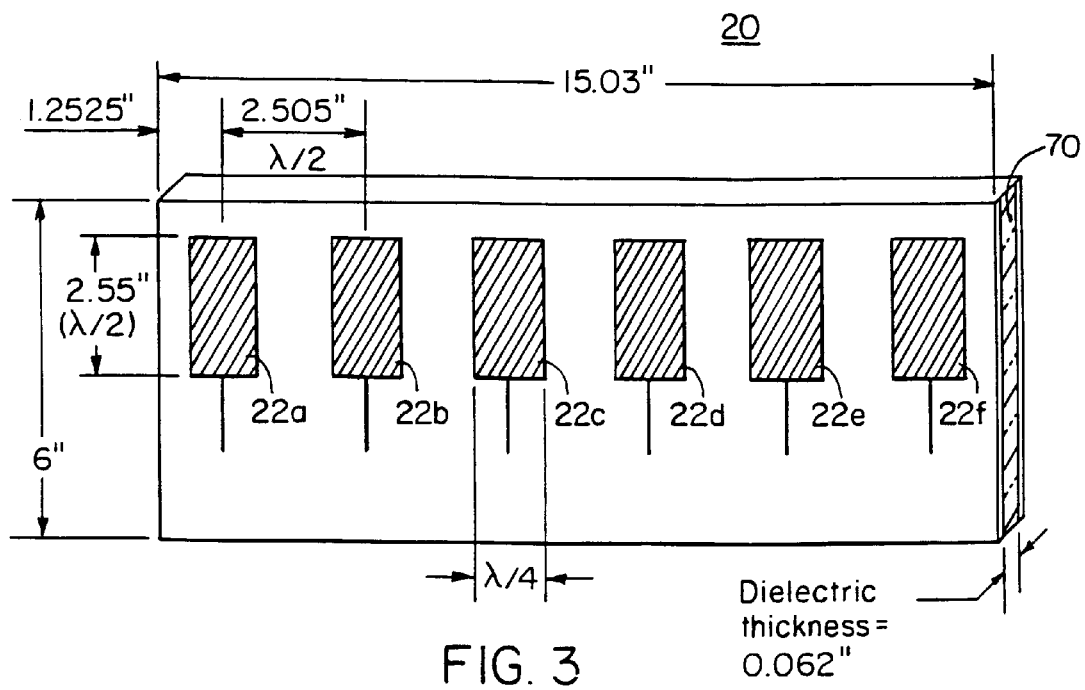
Figure 4:
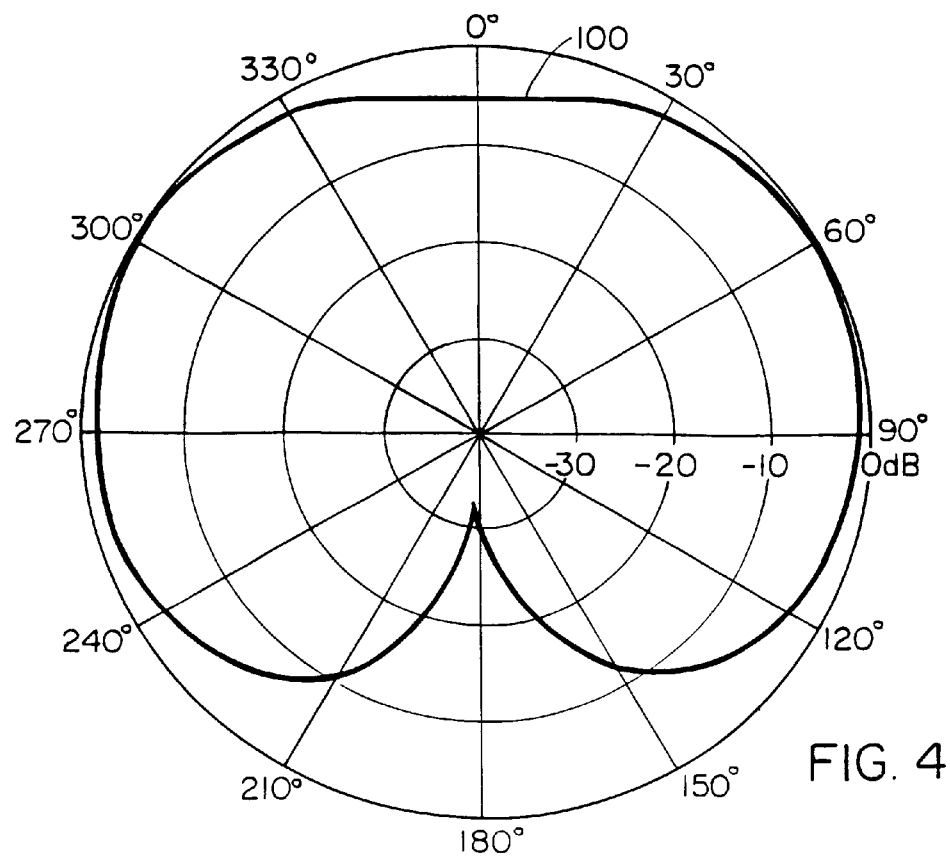

FIG. 3 is a schematic diagram showing the details of the cylindrical array of linearly polarized individually weighted antenna elements according to this invention fabricated as a microstrip antenna on a two-sided one ounce copper clad circuit board and substrate before being conformed to a cylindrical shape; and FIG. 4 illustrates a measured antenna gain showing the deep, sharp null generated in the antenna gain pattern in the direction of the jamming signal.

Figure 1:
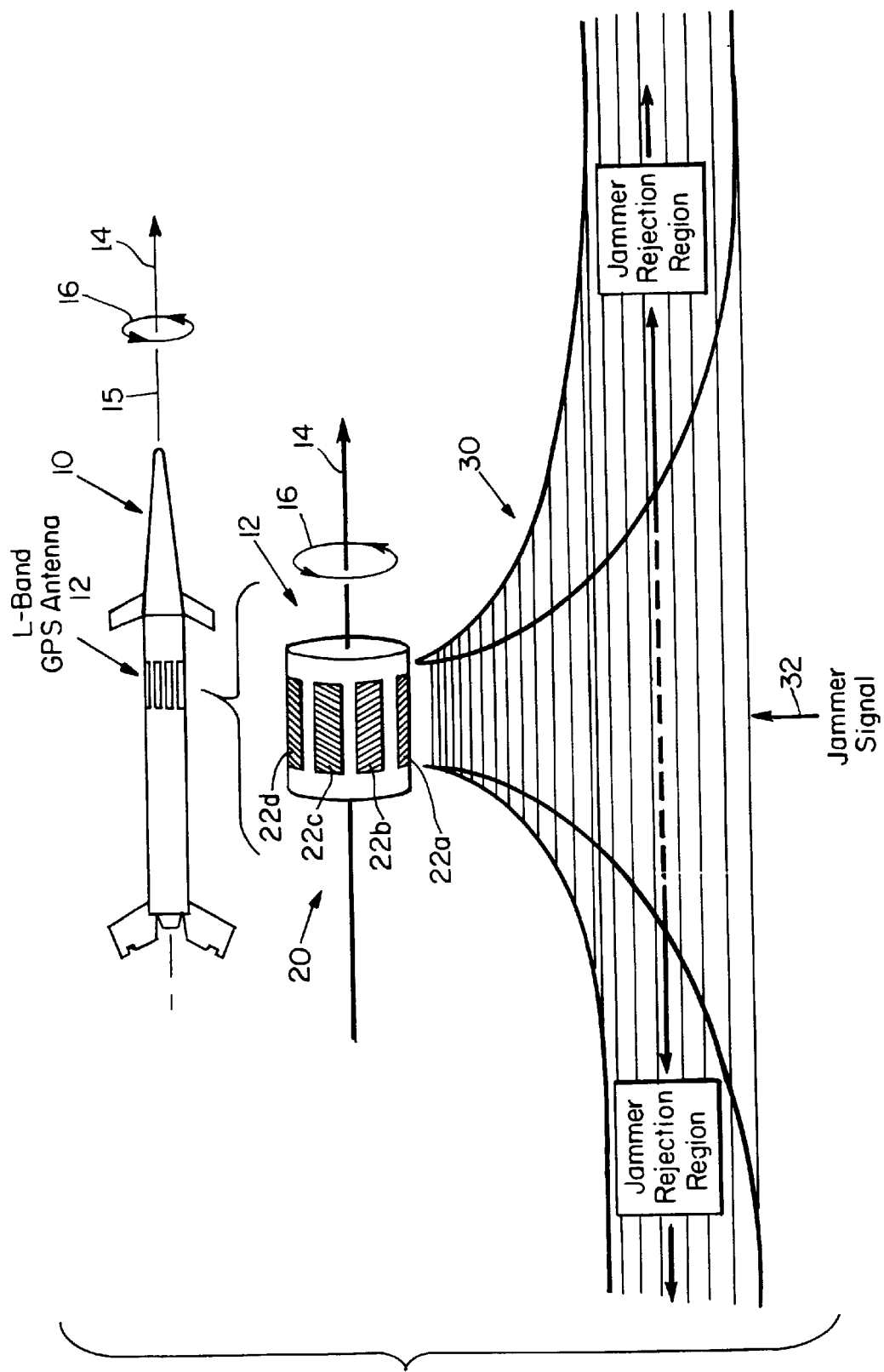
FIG. 1 is a schematic diagram of a munition containing an antijam null steering conformal cylindrical antenna system according to this invention with an exploded portion in three dimensions showing the null region generated.

There is shown in FIG. 1 a missile or munition such as a 5 inch or 155 mm projectile 10 which carries a null steering conformal cylindrical antenna system 12 according to this invention which is exploded out beneath missile 10. Missile 10 is moving in the direction of arrow 14 and is rotating around its longitudinal axis 15 in a conventional way as indicated by arrow 16. System 12 includes an conformal cylindrical antenna system 20 including a plurality of equally spaced axial dipole elements 22a–22n. This cylindrical array of linearly polarized individually weighted antenna elements 22a–n in cooperation with the remainder of the antijam null steering conformal cylindrical antenna system 12 including a plurality of weighting circuits and means responsive to the power output of the weighting circuits for decreasing the sensitivity in the direction of the maximum incident power creates a null 30 in the direction of the maximum incident power signal or jammer signal 32.

Figure 2:
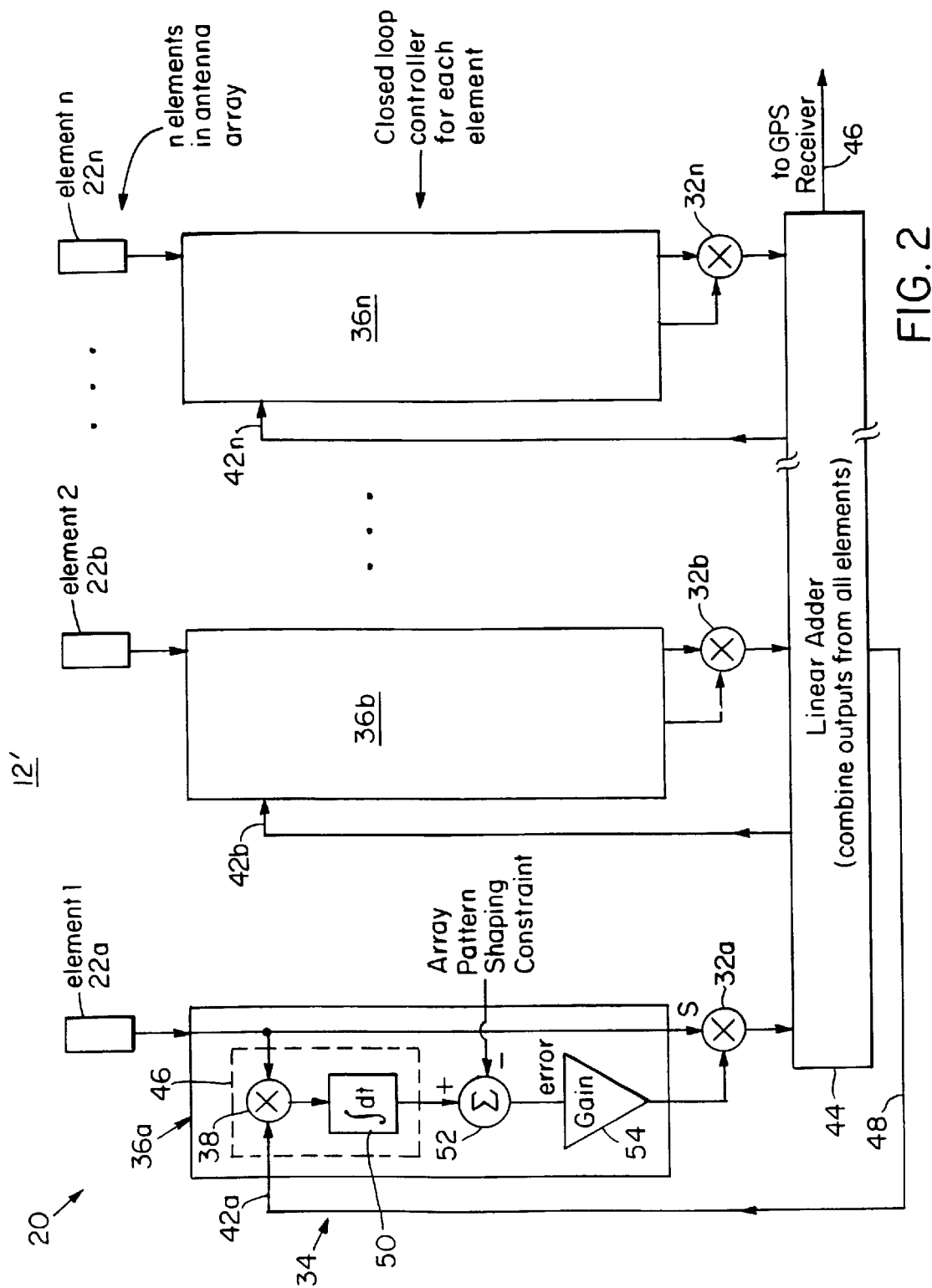
FIG. 2 is a more detailed schematic block diagram of the antijam null steering conformal cylindrical antenna system of FIG. 1 implemented using a constrained power minimization circuit such as a modified Applebaum circuit or a least mean square circuit.

The antijam steering conformal cylindrical antenna system 12', FIG. 2, may be implemented using a constrained power minimization circuit, for example, a modified Applebaum circuit or least means square circuit, such as described in Steinberg, B. D., *Principles of Aperture and Array System Design*, John Wiley & Sons (1976).

Antijam null steering conformal cylindrical antenna system 12' includes a weighting circuit 32a, 32b, . . . 32n associated with each antenna element 22a–n and some means responsive to the power output of the weighting circuits for decreasing the sensitivity in the direction of the maximum incident power. In FIG. 2 such means is embedded in a constrained power minimization circuit, e.g., a modified Applebaum circuit 34 including a plurality of gain control circuits 36a, 36b, . . . 36n, one associated with each antenna element 22a–n and weighting circuit 32a–n. Each gain control circuit as exemplified by gain control circuit 36a includes a multiplying circuit 38 which receives one input from antenna element 22a on line 40 and a second input on line 42 from linear adder 44. Linear adder 44 combines the outputs from each of the weighting circuits 32a–n and provides the combined output to the GPS receiver on line 46 and feeds it back on line 48 to each of the gain control circuits 36a–n. Multiplier 38 and integrator 50 act as a comparator to provide an output to summer 52 which represents the proportion of the presence of the input signal from antenna signal 22a present in the feedback signal 42a. Summer 52 introduces the array pattern shaping constant signal and the output therefrom is delivered to gain circuit 54 which provides an output to weighting circuit 32a to control the weighting so that it proportionately reduces the input contribution from antenna 22a to the overall signal output from linear adder 44.

In operation, linear adder 44 combines the weighted outputs from gain control circuits 36a–n associated with each of the antenna elements 22a–n and feeds them back over line 48 to each of the feedback lines 42a–42n. It is this signal that is compared in multiplier 38 and integrator 50 with the input signal from antenna element 22a to produce a signal which represents the extent to which the signal from antenna 22a forms a portion of the feedback signal on line 42a. Summer 52 simply acts to set a threshold beneath which the reduction of the incoming signal will not occur. This is to ensure that the circuit 36a does not act to null every signal received on antenna 22a regardless of its amplitude: that is, below some level it does not regard a signal as a possible jamming signal even if it does form a substantial portion of the feedback signal on line 42a. In this way a jamming signal, which is typically the strongest signal sensed by the antenna array, is detected and the sensitivity of the antenna array in that direction is substantially reduced in order to increase the signal to noise ratio between the GPS signal and the jamnming signal.

Other means for decreasing the sensitivity may be used beside the Applebaum to circuit. For example, a least mean square circuit can be used by adding in a squaring circuit on line 48 before the signal is delivered to feedback line 42a–n and multiplier 38. A similar squaring circuit would be added between the output of antenna elements 22a–n and their respective multipliers 38.

The antijam null steering conformal cylindrical antenna system 20 is shown in greater detail in FIG. 3 where there are actually six antenna elements 22a–f mounted on the two-sided one-ounce copper-clad circuit board having an epsilon of 2.17 fabricated as a microstrip antenna on an Arlon P/N LX 06201711 substrate 70. Each of the antenna elements are approximately half a wavelength or 2.55 inches long, 1.2 inches or one quarter wavelength wide, and are spaced on centers of 2.505 inches or approximately one half wavelength for use in a GPS system operating at 1.57542 GHz. While using these linearly polarized antennas does reduce the GPS signal reception by a factor of two compared to more conventional circularized polarized antennas, the noise rejection obtainable from the anti-jam antenna system is worth the sacrifice for it can reduce the jamming signal by a factor of 1000 and thus greatly enhance the overall GPS recovery. Because the linearly polarized antenna elements 22a–f are narrower, more of them can be placed on the small circumference of a munition with ample spacing between them. This produces a more uniform gain in the direction of the satellite and reduces mutual coupling which enables a sharper focusing of the null and consequent deeper nulling ability.

That this is so can be seen from the gain pattern measurement FIG. 4, showing the nulling performance of the antijam null steering conformal cylindrical antenna system according to this invention. The measured gain pattern 100 shows that in the direction of the jamming signal at approximately 180° the jamming signal has been decreased by 33 db. Since there is a loss of 3 db or one half the power when using a linearly polarized antenna array instead of a circularly polarized array, the difference is about 30 db or about a factor of 1000. Thus by sacrificing half of the GPS signal, for example, we have increased the signal to noise ratio between the GPS and the jamming signal by a factor of 1000.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An antijam null steering conformal cylindrical antenna system comprising:

a cylindrical array of linearly polarized individually weighted antenna elements capable of being positioned radially about a 5 inch projectile;

a plurality of weighting circuits one associated with each of said elements; and a minimization circuit responsive to the power output of said weighting circuits for maintaining a constant reduced sensitivity in the direction of maximum incident power and for increasing the signal to noise ratio between a global position system signal and a jamming signal system while said small projectile is spinning.

2. The antijam null steering conformal cylindrical antenna system of claim 1 in which said cylindrical array is a right circular cylinder array.

3. The antijam null steering conformal cylindrical antenna system of claim 1 in which said elements are approximately one half wavelength long.

4. The antijam null steering conformal cylindrical antenna system of claim 1 in which said elements are approximately one quarter wavelength wide.

5. The antijam null steering conformal cylindrical antenna system of claim 1 in which said elements are approximately one half wavelength spaced on center.

6. The antijam null steering conformal cylindrical antenna system of claim 1 in which there are at least four said elements.

7. The antijam null steering conformal cylindrical antenna system of claim 1 in which said weighting circuits include a gain circuit.

8. The antijam null steering conformal cylindrical antenna system in which said antenna system is a GPS receiver antenna system having a frequency of approximately 1.5 GHz.

9. The antijam null steering conformal cylindrical antenna system of claim 1 in which said minimization circuit for decreasing sensitivity includes a constrained power minimization circuit.

* * * * *